US012639937B2

(12) United States Patent　　(10) Patent No.:　US 12,639,937 B2
Savvides et al.　　　　　　　　　(45) Date of Patent:　　May 26, 2026

(54) SYSTEM AND METHOD FOR REDUCING FALSE POSITIVES IN OBJECT DETECTION FRAMEWORKS

(71) Applicant: CARNEGIE MELLON UNIVERSITY, Pittsburgh, PA (US)

(72) Inventors: Marios Savvides, Pittsburgh, PA (US); Uzair Ahmed, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 336 days.

(21) Appl. No.: 18/273,183

(22) PCT Filed: Feb. 16, 2022

(86) PCT No.: PCT/US2022/016510

§ 371 (c)(1),
(2) Date: Jul. 19, 2023

(87) PCT Pub. No.: WO2022/177928

PCT Pub. Date: Aug. 25, 2022

(65) Prior Publication Data

US 2024/0303979 A1　　Sep. 12, 2024

Related U.S. Application Data

(60) Provisional application No. 63/149,823, filed on Feb. 16, 2021.

(51) Int. Cl.
*G06V 10/778*　　　(2022.01)
*G06V 10/75*　　　　(2022.01)

(52) U.S. Cl.
CPC ........ *G06V 10/7788* (2022.01); *G06V 10/757* (2022.01)

(58) Field of Classification Search
CPC ......................... G06V 10/7788; G06V 10/757
See application file for complete search history.

(56) References Cited

U.S. PATENT DOCUMENTS 7,035,461 B2 *　4/2006　Luo ...................... G06V 40/161
382/167
8,213,700 B2 *　7/2012　Periaswamy ......... G06T 7/0012
382/131

(Continued)

FOREIGN PATENT DOCUMENTS

WO　　WO-2019046820 A1 *　3/2019　........... G06V 40/165

OTHER PUBLICATIONS

International Search Report and Written Opinion for the International Application No. PCT/US22/14833, mailed Apr. 26, 2022, 7 pages.

*Primary Examiner* — Manav Seth

(74) *Attorney, Agent, or Firm* — KDW FIRM PLLC

(57) ABSTRACT

Disclosed herein is a system and method for reducing false positives in object detection frameworks. A human reviews objects detected by the object detection framework and indicates whether the object is an object of a class for which the object detection framework is trained to detect. When an indication of a false positive been received, a feature representation of displayed object is stored in a gallery. During an inference or testing phase, the gallery is searched for a feature representation matching the feature representation of the detected objects, and, if a match is found, the detected object is deemed to be a false positive and is not identified as an object for which the object detection framework has been trained to detect.

7 Claims, 2 Drawing Sheets

(56) References Cited

U.S. PATENT DOCUMENTS

| | | | | |
|---|---|---|---|---|
| 8,280,894 | B2 * | 10/2012 | Bohn | G06Q 30/02 |
| | | | | 705/26.61 |
| 9,594,942 | B2 * | 3/2017 | Saklatvala | G06F 18/22 |
| 9,665,606 | B2 * | 5/2017 | Song | G06F 16/2246 |
| 10,037,471 | B2 * | 7/2018 | Satzoda | G06V 10/763 |
| 10,535,146 | B1 * | 1/2020 | Buibas | G06T 17/00 |
| 10,872,269 | B2 * | 12/2020 | Roy Chowdhury | G05D 1/0088 |
| 10,885,400 | B2 * | 1/2021 | Zhao | G06N 3/08 |
| 10,915,730 | B2 * | 2/2021 | Karpas | G06V 20/64 |
| 10,922,574 | B1 * | 2/2021 | Tariq | G06V 10/25 |
| 10,943,346 | B2 * | 3/2021 | Wirch | G06T 3/147 |
| 10,986,287 | B2 * | 4/2021 | Liu | H04N 5/265 |
| 11,017,261 | B1 * | 5/2021 | Zheng | G06V 10/764 |
| 11,035,802 | B2 * | 6/2021 | Chen | G06T 7/0004 |
| 11,205,068 | B2 * | 12/2021 | Broggi | G06V 20/597 |
| 11,238,223 | B2 * | 2/2022 | Nuolf | G06F 8/33 |
| 11,288,835 | B2 * | 3/2022 | Ning | G06T 7/73 |
| 11,544,843 | B2 * | 1/2023 | Moen | G06V 10/774 |
| 11,553,874 | B2 * | 1/2023 | Hillen | G06F 18/2413 |
| 11,748,796 | B2 * | 9/2023 | Gupta | G06F 18/23 |
| | | | | 705/27.2 |
| 12,147,878 | B2 * | 11/2024 | Balasubramanian | |
| | | | | G06V 10/776 |
| 2011/0249867 | A1 * | 10/2011 | Haas | G06V 10/7747 |
| | | | | 382/103 |
| 2011/0255743 | A1 * | 10/2011 | Guan | G06V 20/582 |
| | | | | 382/103 |
| 2016/0217344 | A1 * | 7/2016 | Misra | G06F 18/217 |
| 2018/0012082 | A1 * | 1/2018 | Satazoda | G06V 10/763 |
| 2018/0089497 | A1 * | 3/2018 | Romanenko | G06V 10/255 |
| 2018/0089540 | A1 | 3/2018 | Merler et al. | |
| 2019/0095716 | A1 | 3/2019 | Shrestha et al. | |
| 2019/0272451 | A1 | 9/2019 | Lin et al. | |
| 2019/0385018 | A1 * | 12/2019 | Ngo Dinh | G06N 3/0895 |
| 2021/0019572 | A1 | 1/2021 | Munoz Delgado | |
| 2021/0407266 | A1 * | 12/2021 | Jarvis | G06N 3/02 |
| 2022/0254137 | A1 * | 8/2022 | Tu | G06V 10/765 |
| 2023/0079886 | A1 * | 3/2023 | Amirghodsi | G06V 10/771 |
| | | | | 706/25 |
| 2023/0377709 | A1 * | 11/2023 | Shelton, IV | G16H 40/20 |
| 2024/0160194 | A1 * | 5/2024 | Bakhshmand | G06N 20/10 |
| 2025/0258595 | A1 * | 8/2025 | Victory | G06F 3/04842 |

* cited by examiner

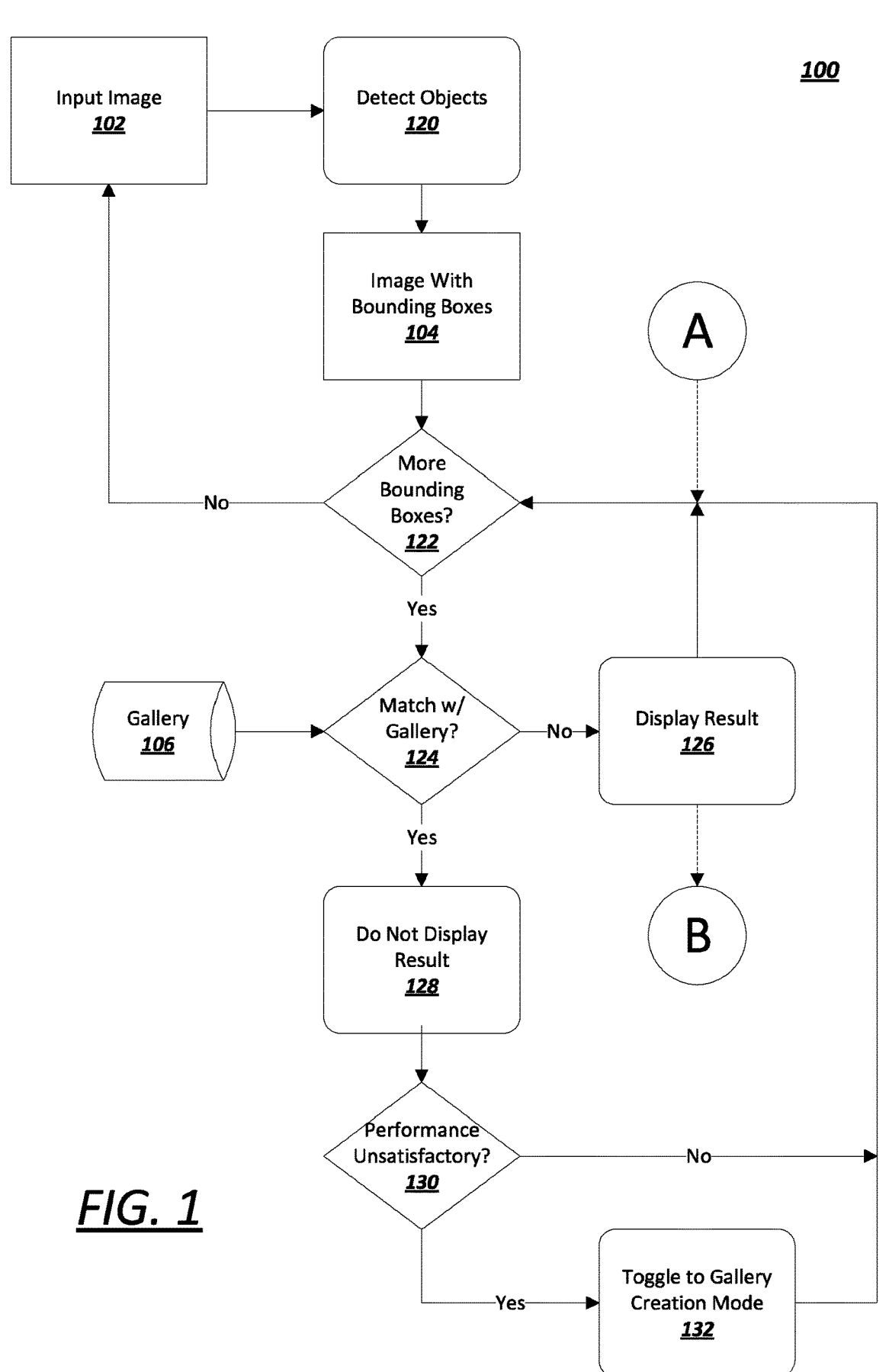
_FIG. 1_

SYSTEM AND METHOD FOR REDUCING FALSE POSITIVES IN OBJECT DETECTION FRAMEWORKS

RELATED APPLICATIONS

This application claims the benefit of U.S. Provisional Patent Application No. 63/149,823, filed Feb. 16, 2021, the contents of which are incorporated herein in their entirety.

BACKGROUND

Deep neural networks trained as object detection models may often return false positive results. A false positive result occurs when the model labels or classifies an object in an image when it should not have. For example, classifying an image of a cat as a dog.

In a deep neural network, an object detection model will take an image as input and will typically place bounding boxes around detected objects for which the object detection model has been trained to detect and classify. At a high level, the objects are detected by comparing a feature representation of the object with feature maps in the model. The object detector may return a probability that a detected object is an object that the model was trained to classify and return a positive result if the probability exceeds a certain threshold. Thus, an object having an appearance similar to the target object may generate a false positive.

In the context of object detection, it is naturally desirable to reduce occurrence of false positive results to the greatest extent possible. This may be critical in certain applications, for example, wherein the object detector is examining medical specimens for evidence of objects representing disease conditions or in certain applications for autonomous vehicle operation.

SUMMARY

Disclosed herein is a system and method for reducing false positives in object detection frameworks. The method is designed to work with any configuration of a deep CNN model and can work without any explicit model retraining. In this method, a human-in-the-loop review is performed to determine if a detected object is a false positive. If an indication is received from the user of a false positive, a CNN feature representation of the object that can be used for matching the object to another feature representation is added to a gallery. In testing, if a similar feature representation from a similar object is matched against any feature representation stored in the gallery, then the prediction is determined to be a false positive, without any kind of model re-training, and the prediction will not be presented to the user.

BRIEF DESCRIPTION OF THE DRAWINGS

By way of example, a specific exemplary embodiment of the disclosed system and method will now be described, with reference to the accompanying drawings, in which:

FIG. 1 is a flow diagram showing a process of the method during the inference mode of operation.

DETAILED DESCRIPTION

Figure 2:
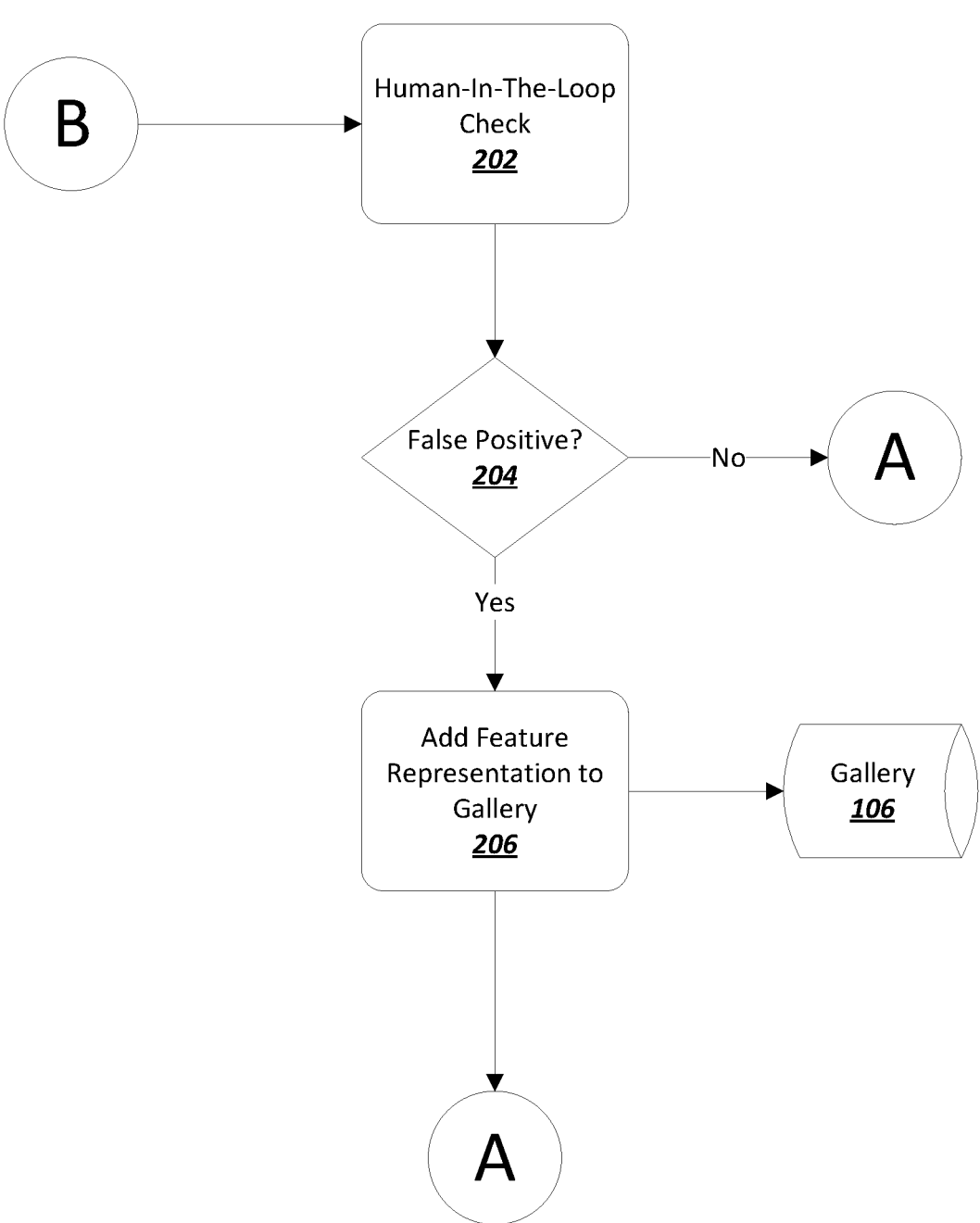
FIG. 2 is a flow diagram showing the process of user review and updating of the gallery.

The disclosed invention addresses the problem of suppressing false positive detection results by building a gallery on the fly through a Human-In-The-Loop (HITL) strategy during a gallery creation phase. The human-in-the-loop manually audits the output of the object detection model to identify the false positives and their respective feature representations are added to the feature gallery. After a substantial amount of enrollment of feature representations from false positives, the gallery creation phase of the process completes and an inference (testing) phase begins, without the intervention of an HITL.

If the performance during the inference phase falls below a pre-determined threshold or if there is an increased observation of false positive detections, the system toggles back to the gallery creation phase from the inference phase until satisfactory performance is met and sustained for a certain amount of time. On success, the process toggles back into the inference phase.

To suppress the false positive results, the corresponding feature representation of each detected bounding box result is matched with all of the feature representations in the false positive feature gallery. If a match is found, then the particular feature representation of the detection result is suppressed and not displayed to the end user. If the feature representation of the detected bounding box is not found in the gallery, then the result is displayed and, if the method is operating in the gallery creation phase, is followed by manual human audit. The system toggles from the inference phase to the gallery creation phase when the performance is unsatisfactory (i.e., for example, when the percentage of false positives rises above a threshold, leading to user dissatisfaction) and from the gallery creation phase to the inference phase after additional training.

FIG. 1 is a flowchart showing the steps of process 100 for the inference mode of operation of the method. This flowchart assumes that a gallery 106 has already been created during a gallery creation phase, which is discussed later.

During process 100, an input image 102 is input to an object detection model which is typically a deep CNN network. At step 120, objects for which the object detection model has been trained to detect that are depicted in image 102 are detected and classified. This results in an image 104 having bounding boxes enclosing the detected objects in image 102. The rest of the process of inference mode 100 is iterated for each bounding box in image 104.

At decision point 122, it is determined if there are more bounding boxes in image 104 that need to be processed and, if not, a new input image 102 is obtained. If there are more bounding boxes in image 104, a feature representation of one of the objects in a bounding box is attempted to be matched, at decision point 124, with feature representations in gallery 106. In other words, feature galley 106 is searched for a match for the feature representation of the object. The feature representations in gallery 106 are representative of false positives previously detected by the object detection model.

In one embodiment, cosine similarity can be used for matching. A predefined threshold is set, and if the similarity is more than the threshold, a match is confirmed.

At decision point 124, if there are no matches between the current feature representation and the feature representations stored in gallery 106, then the object is displayed at step 126 and control returns to decision point 122, where it is determined if there are more bounding boxes in image 104 that need to be processed.

If the current feature representation, at decision point 124, does match with a feature presentation stored in gallery 106, then, at step 128, the result is not displayed, as it has now been identified as a false positive.

At decision point 130, a decision is made as to whether the performance of the model has become unsatisfactory. The determination of whether the performance has become unsatisfactory may be made manually by a user or may be algorithmically determined using some metric. The performance may be deemed to be unsatisfactory if, for example, the percentage of false positives rises above a predetermined threshold. In any case, if the performance has been deemed to be unsatisfactory, then, at step 132, the method toggles to the gallery creation mode.

In gallery creation mode, at decision point 124, if the current feature representation does not match any feature representations stored in gallery 106 then the result is displayed at step 126 and control proceeds to entry point "B" shown in FIG. 2, which depicts the human-in-the-loop review process 200.

FIG. 2 shows the steps of the HITL review process 200 of the method. At step 202, an HITL check is performed on the object that was displayed at step 126 of process 100 of FIG. 1. The HITL check at step 202 has a user manually indicating whether the displayed result is a false positive. The detected object may be false positive if the object is identified by the object detection model as belonging to a class for which the object detection model was trained to classify, but the displayed result does not actually depict an object in that class.

If the user indicates that the result is a false positive at decision point 204 then, at step 206, the feature representation of the object is added to gallery 106 and control returns to entry point "A" in FIG. 1, where, at decision point 120, it is determined if more bounding boxes are present in the current image 104.

If, at decision point 204, the user indicates that the displayed result is not a false positive, control proceeds to entry point "A" in FIG. 1 without adding the feature representation of the displayed result to the gallery 106. When a sufficient number of additional results have been evaluated by the user, the gallery creation mode is toggled off and the method proceeds in inference mode in accordance with process 100 depicted in FIG. 1. The number of additional results necessary to be evaluated by the user to improve accuracy of the object detection model may be determined by the user or may be determined algorithmically.

As would be realized, the method must initially be run in gallery creation mode to establish the initial gallery used by the method in inference mode.

The method disclosed herein may be used by any object detection model to improve the accuracy and reduce the incidence of false positives produced by the model.

As would be realized by one of skill in the art, the disclosed method described herein can be implemented by a system comprising a processor and memory, storing software that, when executed by the processor, performs the functions comprising the method.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method for improving performance of an object detection model comprising:

entering a gallery creation mode of the object detection model;

detecting, using the object detection model, an object in an image;

determining whether a feature representation of the detected object matches any feature representation in a false positive feature gallery containing feature representations of detected objects that have been identified as false positives; and when the feature representation of the detected object does not match any feature representation in the false positive feature gallery:

displaying the detected object;

receiving input from a human indicating if the displayed object is of a class that the object detection model has been trained to detect; and adding the feature representation of the displayed object to the false positive feature gallery when the received input indicates that the displayed object is not of a class that the object detection model has been trained to detect; and iterating the method for multiple images.

2. The method of claim 1 further comprising:

entering an inference mode of the object detection model;

detecting, using the object detection model, an object in an image;

determining whether a feature representation of the detected object appears in a false positive feature gallery containing feature representations of images that have been identified as false positives; and when the feature representation of the detected object appears in the false positive feature gallery, not indicating that the detected object is an object of a class for which the object detection model has been trained to detect.

3. The method of claim 1 further comprising, when in inference mode:

determining that the performance of the object detection model is unsatisfactory; and initiating the gallery creation mode.

4. The method of claim 3 wherein the performance of the object detection model is deemed to be unsatisfactory when performance of the object detection model falls below a predetermined threshold during the inference phase.

5. The method of claim 1 wherein a match between feature representations in the false positive feature gallery and the feature representation of the detected object is determined using cosine similarity.

6. The method of claim 1 wherein a match between the feature representation of the detected object and a feature representation in the false positive feature gallery is determined when their cosine similarity exceeds a predetermined threshold.

7. A system comprising:

a processor;

an object detection model;

a false positive feature gallery; and software that, when executed by the processor, performs the steps of the method of claim 2.

* * * * *